United States Patent [19]

Kawai et al.

[11] 4,417,260
[45] Nov. 22, 1983

[54] IMAGE SCANNING SYSTEM

[75] Inventors: Yasuhiro Kawai; Yoshihiko Okamoto; Takaaki Yamamoto; Hisatoyo Kato, all of Minami-ashigara, Japan

[73] Assignee: Fuji Photo Film Co., Ltd., Kanagawa, Japan

[21] Appl. No.: 397,443

[22] Filed: Jul. 12, 1982

[30] Foreign Application Priority Data

Jul. 23, 1981 [JP] Japan .................. 56-115664

[51] Int. Cl.³ .......................................... G01D 15/14
[52] U.S. Cl. .................................. 346/160; 346/160.1
[58] Field of Search .................... 346/76 L, 108, 109, 346/160, 160.1; 358/296, 312

[56] References Cited

U.S. PATENT DOCUMENTS 4,233,612 11/1980 Hirayama et al. ................. 346/160
4,258,264 3/1981 Kotera ............................ 250/484.1
4,297,713 10/1981 Ichikawa et al. ............... 346/160 X Primary Examiner—L. T. Hix
Assistant Examiner—D. Jennings
Attorney, Agent, or Firm—Gerald J. Ferguson, Jr.; Joseph J. Baker

[57] ABSTRACT

In an image scanning system in which a light beam is deflected by an optical deflector to effect the main scanning across a recording medium while the subscanning is effected by mechanically moving the recording medium, the optical components for scanning the light beam across the recording medium and the mechanical components for moving the recording medium in the sub-scanning direction are all mounted on a single frame. The single frame is mounted by way of a vibration insulator on an outer frame structure of the system on which means for feeding the recording medium to the scanning position and for discharging it therefrom is mounted.

8 Claims, 4 Drawing Figures

IMAGE SCANNING SYSTEM

BACKGROUND OF THE INVENTION

1. Field of the Invention

This invention relates to an image scanning system for scanning a light beam to record an image or to read a recorded image, and more particularly to an image scanning system in which the main scanning of the light beam is effected by deflecting the light beam across a recording medium using an optical deflector and the sub-scanning is effected by mechanically moving the recording medium.

2. Description of the Prior Art

In an image recording system or an image reading system in which a light beam emitted from a light source is guided to a recording medium by way of optical systems such as optical deflectors and mirrors, turbulence in the image scanning is apt to occur because of minute displacements of the optical components which are amplified by the optical lever effect. These displacements of the optical components are generated by external forces due to forced vibrations from various actuators inside the system and/or from outside. In order to reduce the influence of the external forces, various remedies have been used. For example, conventional remedies include providing each actuator with an antivibration device, increasing the rigidity of the overall system and controlling the operating sequence to make the actuators inoperative while the scanning is being effected. Conventional remedies for eliminating vibrations from outside the system include placing the overall system on an antivibration platform and fixing the overall system on a large base.

The conventional remedies are disadvantageous in that in the case of a system provided with devices for feeding recording media thereto and discharging them therefrom, the overall system becomes complicated and the manufacturing cost thereof is significantly increased. For example, if each actuator is provided with an antivibration device or the rigidity of the frame is increased, the manufacturing cost of the system or the weight of the overall system is directly increased. If the operating sequence is arranged to make the actuators inoperative while the scanning is being effected, the cycle time of the system is lengthened and the efficiency of the system is lowered.

SUMMARY OF THE INVENTION

The primary object of the present invention is to provide an image scanning system in which turbulence in the image scanning due to forced vibrations from actuators inside the system and/or from outside is effectively prevented without increasing the manufacturing cost thereof or lengthening the cycle time thereof.

In accordance with the present invention, components for main scanning and sub-scanning such as a light source, an optical system for deflecting the light beam emitted from the light source, an electric motor for the sub-scanning and a mechanism driven by the electric motor for feeding a recording medium in the sub-scanning direction are all mounted on a single frame structure, and the frame structure is mounted via a vibration insulator (e.g., springs, rubbers) on the body structure of the system for mounting all components thereof including means for feeding recording media into the system and discharging them therefrom. When a spring is used as the vibration insulator, the spring constant thereof is selected with respect to the mass of said frame structure so that the frequency of the vibration of the frame is sufficiently lower than the natural frequency of the frame structure itself.

In accordance with the present invention, turbulence in image scanning which results in distortion of a part of a recorded image, cyclic unevenness of the density in a recorded image and displacement of a recorded image can be effectively prevented. It is considered that this is because the vibration of the scanning section is insulated from the vibration of the feeding/discharging mechanism of the recording medium.

DESCRIPTION OF THE PREFERRED EMBODIMENT

Figure 1:
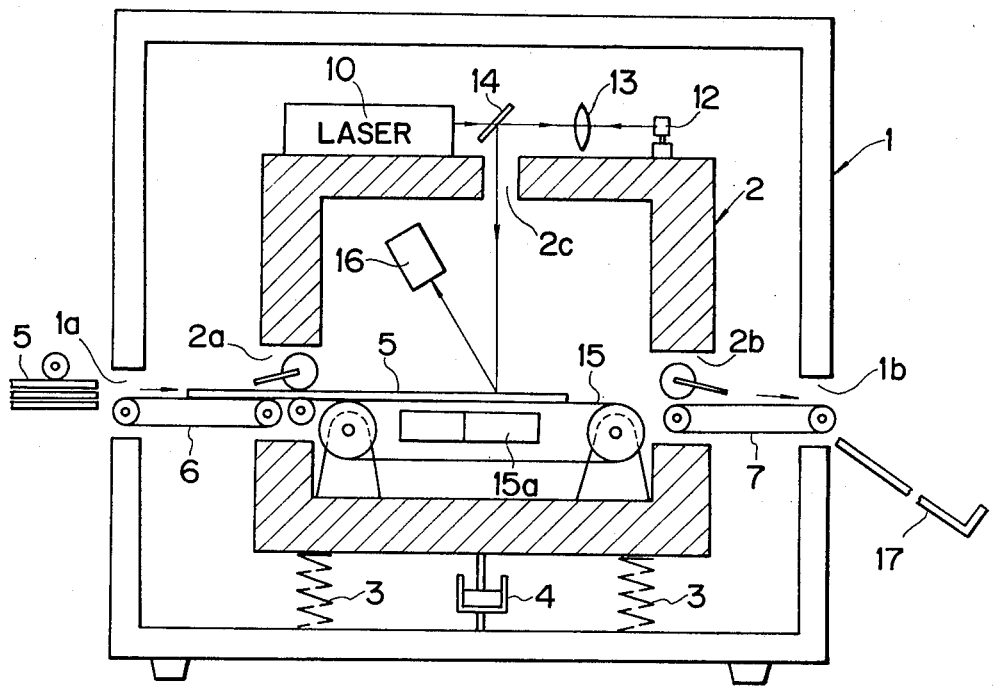
FIG. 1 is a side elevational view partly in cross section of an image scanning system in accordance with an embodiment of the present invention.
Figure 2:
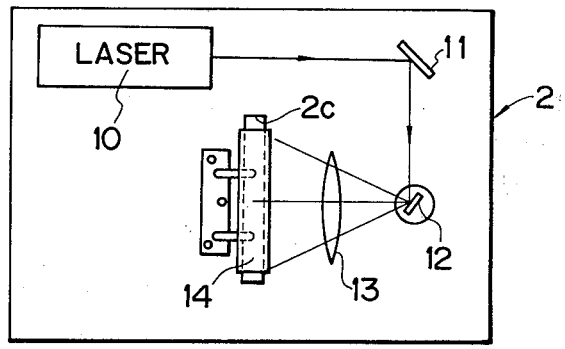
FIG. 2 is a plan view of a part of the system shown in FIG. 1.

FIG. 1 is a side elevational view partly in cross section of an image scanning system for reading a recorded image in accordance with an embodiment of the present invention, and FIG. 2 is a fragmentary plan view of FIG. 1.

The overall system of this embodiment is contained in a large outer frame 1. An inner frame 2 which is generally rectangular in cross section is supported in the outer frame 1 by a vibration insulator comprising springs 3 and a damper 4. The outer frame 1 is provided in a pair of opposed side walls thereof with an inlet port 1a for receiving an original 5 bearing thereon image information, and an outlet port 1b for discharging the original 5 after the scanning is completed. A receiving conveyor belt 6 and a discharging conveyor belt 7 are provided adjacent to the inlet port 1a and the outlet port 1b, respectively.

The inner frame 2 is provided with an inlet port 2a opposed to the inlet port 1a of the outer frame 1 and the receiving conveyor belt 6 extends between the inlet ports 1a and 2a. The inner frame 2 is further provided with an outlet port 2b opposed to the outlet port 1b of the outer frame 1 and the discharging conveyor belt 7 extends between the outlet ports 1b and 2b. In the top wall of the inner frame 2 is formed an opening 2c through which a scanning light beam travels. On the top wall of the inner frame 2 is mounted an optical system for scanning the light beam comprising a laser source 10, a mirror 11 for reflecting a laser beam emitted from the laser source 10, a galvanometer mirror 12 for deflecting the laser beam reflected by the mirror 11, a condenser lens 13 for focusing the deflected laser beam from the galvanometer mirror 12 on the surface of the original 5 and a mirror 4 for downwardly reflecting the laser beam passing through the lens 13, toward the surface of the original 5 through said opening 2c.

In the interior of the inner frame 2 is provided a horizontally extending feeding belt 15 for feeding the original 5 in the sub-scanning direction. A suction box 15a is disposed under the feeding belt 15 in order to hold the original 5 in a predetermined position on the feeding belt 15. Near the receiving conveyor belt 6 is disposed a locating means (not shown) for precisely locating the original 5 with respect to the feeding belt 15.

There is disposed above the feeding belt 15 a photodetector 16 which receives light from the original 5. The light from the original 5 may be the scanning light beam reflected by the original 5 or light emitted from the original 5 in case that the original 5 is of a type which emits light when stimulated by a light beam like a stimulable phosphor sheet.

An original receiver 17 is provided outside the outer frame 1 adjacent to the outlet port 1b to receive the original 5 discharged by the discharging conveyor belt 7.

The image scanning system of this embodiment is suitable in case that the original 5 is of the nonbendable stiff plate or rigid sheet type.

In the image scanning system of this embodiment, the laser source 10 (light source), mirrors 11 and 14, the galvanometer mirror 12 (light deflector), the condenser lens 13 and the feeding belt 15 feeding the original in the subscanning direction are all fixed to the inner frame 2 which is insulated from vibrations from outside. For example, the components fixed to the inner frame 2 are independent from the receiving conveyor belt 6 and the discharging conveyor belt 7 and the vibrations from the conveyor belts 6 and 7 are not transferred thereto. Therefore turbulence in reading the image on the original due to the vibrations of the conveyor belts 6 and 7 is prevented and the scanning of the image or the reading of the image can be effected with high accuracy. The photodetector 16 may be fixed to the inner frame 2. This advantageous in that the components of the image reading section are combined into one unit.

The image scanning system of the above embodiment is particularly suitable for a system disclosed in, for example, U.S. Pat. No. 4,258,264 and Japanese unexamined Patent Publication No. 56(1981)-11395 in which the recording medium is a plate like member bearing thereon stimulable phosphor which reproduces a radiation image recorded thereon, in the form of fluorescent light upon exposure to a stimulating ray. In the system the radiation image recorded on the stimulable phosphor sheet is read out by scanning a stimulating light beam thereacross, and the scanning of the stimulating light beam must be effected with high accuracy.

Figure 3:
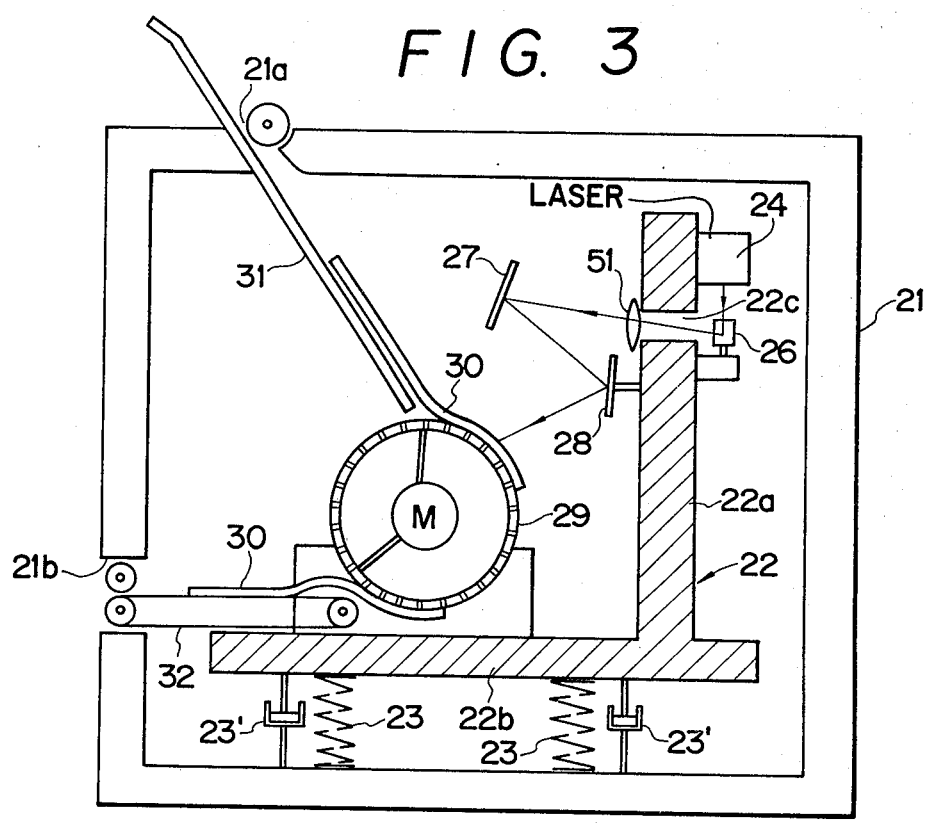
FIG. 3 is a side elevational view partly in cross section of an image scanning system in accordance with another embodiment of the present invention.
Figure 4:
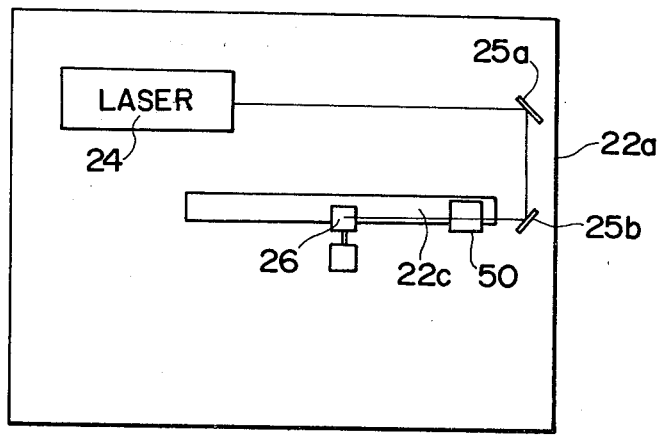
FIG. 4 is a side view of an inner frame employed in the system shown in FIG. 3.

FIGS. 3 and 4 show an image scanning system in accordance with another embodiment of the present invention which is suitable for recording an image on a bendable filmlike recording medium such as a photographic film or a photosensitive film material sensitive to a laser beam.

As shown in FIG. 3 an inner frame 22 is supported in an outer frame 21 by springs 23 and dampers 23'. The inner frame 22 is generally of an L-shape in cross section, and a laser source 24, mirrors 25a and 25b (FIG. 4), a light modulator 50 and a galvanometer mirror 26 are fixedly mounted on the vertical portion 22a thereof. A laser beam emitted from the laser source 24 and deflected by the galvanometer mirror 26 travels through an opening 22c formed in the vertical portion 22a and through a condenser lens 51 to be reflected by a pair of mirrors 27 and 28 in the inner frame 22, thereby being scanned across a photosensitive recording medium 30 on a suction drum 29 mounted on the horizontal portion 22b of the inner frame 22. The recording medium 30 is fed to the suction drum 29 along a guide plate 31 through an inlet 21a formed in the top wall of the outer frame 21. The suction drum 29 feeds the recording medium 30 along the peripheral surface thereof in the sub-scanning direction and delivers the recording medium 30 to a discharging conveyor belt 32 extending toward an outlet 21b formed in one side wall of the outer frame 21.

Also in this embodiment, the laser source 24, the mirrors 25a and 25b, the light modulator 50, the condenser lens 51, the galvanometer mirror 26, the mirrors 27 and 28, and the suction drum 29 for feeding the recording medium in the sub-scanning direction are all fixedly mounted on the inner frame 22 which is insulated from vibrations from the outer frame 21, and thus insulated from vibrations from the devices for feeding the recording medium 30 to the suction drum 29 and discharging the recording medium 30 therefrom. Accordingly, the recording medium 30 is stably fed in the subscanning direction while the laser beam is scanned thereacross, whereby the turbulence in the recorded image can be effectively prevented.

Although in the above embodiment, the optical components for scanning the laser beam across the recording medium 30 are all mounted on the vertical portion 22a of the inner frame 22, of course some of them may be mounted on the horizontal portion 22b thereof within the scope of the present invention.

The embodiment of FIGS. 3 and 4 is suitable for a flexible and bendable recording medium and is suitably applied to a recording system in which an image is recorded on a photosensitive film with a laser beam.

Although, in the above embodiments a rigid plate like recording medium and a flexible photosensitive recording medium are used by way of example, various other recording media can be used depending on the application of the image scanning system. For example, the recording medium may be like a roll sheet or may be shaped like a drum.

The image scanning system shown in FIGS. 1 and 2 is for reading an image on a recording medium. However, the image scanning system can be modified into a recording system by providing a light modulator instead of the photodetector 16. Similarly, though the system shown in FIGS. 3 and 4 is for recording an image, it can be modified into a reading system by providing a photodetector instead of the light modulator 26.

Further, although a combination of springs and dampers is used as the vibration insulator in each of the above embodiments, the vibration insulator may be of any type. For example, the vibration insulator may be a rubber vibration insulator, a static pressure bearing or a magnetic bearing.

In the above embodiments, an endless belt in combination with a suction box and a suction drum are respectively used for feeding the recording medium in the sub-scanning direction. However, other feeding means such as a magnetic drum and a combination of a pinch roller and a rotary drum can be used insofar as the recording medium can be accurately fed in the sub-scanning direction.

Further, a multifaceted mirror or a supersonic deflector can be used as the light deflector instead of the galvanometer mirror.

We claim:

1. An image scanning system for two-dimensionally scanning a light beam across a recording medium comprising a feeding and discharging means for feeding the recording medium to a scanning position and discharging it therefrom, a sub-scanning means for feeding the recording medium in the sub-scanning direction at the scanning position, and a light beam scanning means for scanning the light beam in the main scanning direction at the scanning position, the light beam scanning means including a light source for emitting the light beam and a light deflecting means for deflecting the light beam to sweep the recording medium on the sub-scanning means in the main scanning direction, characterized in that said light source, light deflecting means and the sub-scanning means are mounted on a single inner frame which is mounted by a vibration insulator on an outer frame on which said feeding and discharging means is mounted.

2. An image scanning system as defined in claim 1 in which said sub-scanning means comprises an endless belt having a horizontally extending portion and said inner frame is a tubular member generally rectangular in cross section, said endless belt being mounted in the tubular member on the bottom thereof, said light source and the light deflecting means being fixedly mounted on the top wall of the tubular member, and an opening being formed in the top wall to permit the light beam deflected by the light deflecting means to impinge upon the recording medium on the endless belt.

3. An image scanning system as defined in claim 2 in which said recording medium is a stimulable phosphor sheet on which a radiation image can be recorded, which radiation image can be reproduced in the form of fluorescent light by exposure to a stimulating ray.

4. An image scanning system as defined in claim 1 in which said sub-scanning means comprises a rotary drum, said inner frame is generally of L-shape or inverted T-shape in cross section and comprises a horizontal portion and a vertical portion integrally formed with each other, said rotary drum is horizontally mounted on the horizontal portion of the inner frame, said light source and the light deflecting means are mounted on the vertical portion, and an opening is formed in the vertical portion to permit the light beam deflected by the deflector to impinge upon the recording medium on the rotary drum.

5. An image scanning system as defined in claim 4 in which said light deflecting means comprises a light deflector for deflecting the light beam from the light source in a horizontal plane to pass through said opening and a mirror for reflecting the deflected light beam toward the recording medium on said rotary drum.

6. An image scanning system as defined in claim 4 or 5 in which said rotary drum is a suction drum.

7. An image scanning system as defined in claim 1 in which said sub-scanning means comprises a rotary drum and a pinch roller operatively connected thereto, said inner frame is generally of L-shape or inverted T-shape in cross section and comprises a horizontal portion and a vertical portion integrally formed with each other, said rotary drum is mounted on the horizontal portion, said light source and the light deflecting means are mounted on the vertical portion, and an opening is formed in the vertical portion to permit the light beam deflected by the deflecting means to impinge upon the recording medium on the rotary drum.

8. An image scanning system as defined in claim 7 in which said light deflecting means comprises a light deflector for deflecting the light beam from the light source in a horizontal plane to pass through said opening and a mirror for reflecting the deflected light beam toward the recording medium on said rotary drum.

* * * * *